United States Patent [19]
Björkman et al.

[11] 4,157,930
[45] Jun. 12, 1979

[54] METHOD OF RETREADING VEHICLE TIRES USING MICROWAVE HEATING

[75] Inventors: Leif A. B. Björkman, Stockholm; Lars-Erik J. Eklund, Danderyd, both of Sweden

[73] Assignee: Elektra Regummeringsteknik Aktiebolag, Upsala, Sweden

[21] Appl. No.: 837,638

[22] Filed: Sep. 28, 1977

[30] Foreign Application Priority Data
Oct. 4, 1976 [SE] Sweden .................. 7610987

[51] Int. Cl.² .................. B29H 17/36
[52] U.S. Cl. .................. 156/96; 156/73.1; 156/272; 204/158 R; 219/6.5; 219/10.55 R; 219/244; 260/890; 264/26
[58] Field of Search .................. 260/890, 823, 23.7, 260/29.1, 42.53; 156/73.1, 73.6, 95, 96, 128 R, 272, 273, 274; 204/158; 219/6.5, 10.55 R, 10.57, 243, 244; 264/26

[56] References Cited

U.S. PATENT DOCUMENTS

| 1,805,026 | 5/1931 | State | 156/96 X |
|---|---|---|---|
| 2,405,802 | 8/1946 | Taber | 156/96 |
| 2,421,099 | 5/1947 | Vogt | 156/96 |
| 2,541,644 | 2/1951 | Enabnit | 425/41 |
| 3,236,709 | 2/1966 | Carver | 156/96 |
| 3,471,352 | 10/1969 | Brooke et al. | 156/272 |
| 3,639,190 | 2/1972 | Brooke et al. | 264/26 |
| 3,880,693 | 4/1975 | Urlings et al. | 156/273 |
| 4,046,945 | 9/1977 | Brodie | 156/96 |
| 4,051,090 | 9/1977 | Horowitz et al. | 156/96 |

FOREIGN PATENT DOCUMENTS

| 895371 | 11/1953 | Fed. Rep. of Germany. |
|---|---|---|
| 2122578 | 11/1972 | Fed. Rep. of Germany. |
| 97304 | 11/1939 | Sweden. |
| 105210 | 8/1942 | Sweden. |
| 125411 | 7/1949 | Sweden. |
| 148079 | 12/1954 | Sweden. |
| 340524 | 7/1968 | Sweden. |
| 357918 | 7/1973 | Sweden. |
| 1311126 | 3/1973 | United Kingdom. |

OTHER PUBLICATIONS

"Microwave Heating" by Copson, AVI Pub. Co. Westport Conn., 1962 pp. 11, 12.
"Giant Tire Microwave System" by Smith et al., Rubber Age, Jun. 1975, pp. 43-45.

Primary Examiner—John E. Kittle
Attorney, Agent, or Firm—Haseltine, Lake & Waters

[57] ABSTRACT

A process and a rubber-base bonding material in the form of a preformed strip for retreading vehicle tires using a prevulcanized tread and microwave heating for vulcanizing and binding the bonding strip to the tire carcass and to the tread is disclosed, wherein a bonding strip is used whose dielectric loss factor at the vulcanizing (retreading) temperature is higher than the loss factor of the prevulcanized tread, so that the microwave heat applied will be concentrated to the bonding strip and vulcanize the same providing satisfactory adhesion between carcass and tread without the already prevulcanized tread being destroyed or significantly reduced in quality due to the effect of the excess heat.

2 Claims, 10 Drawing Figures

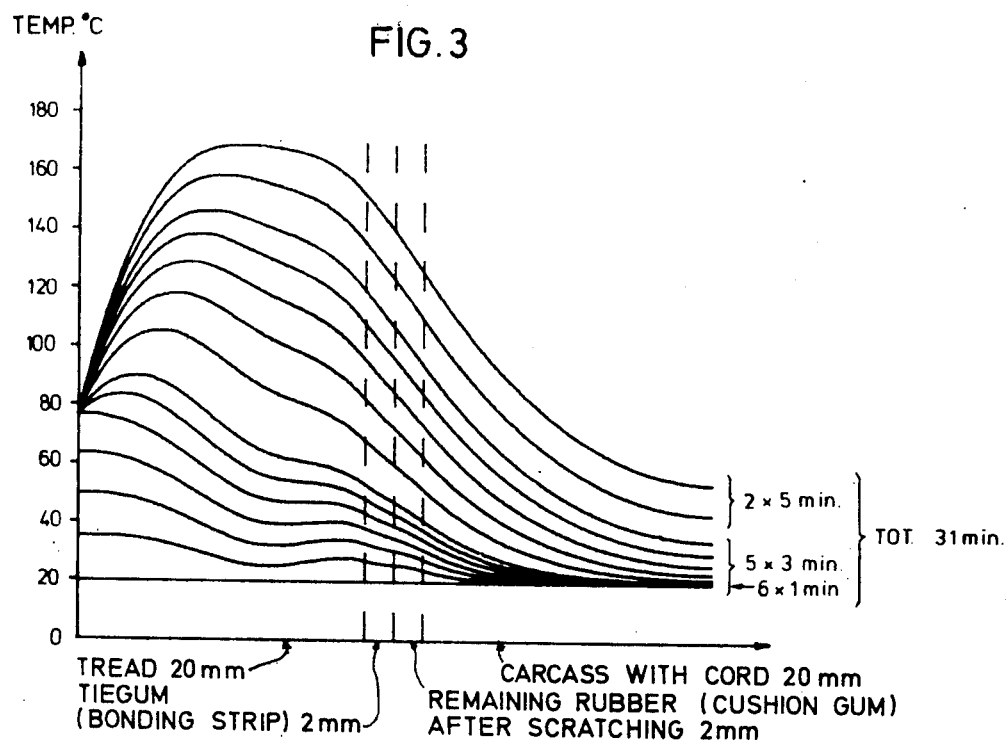
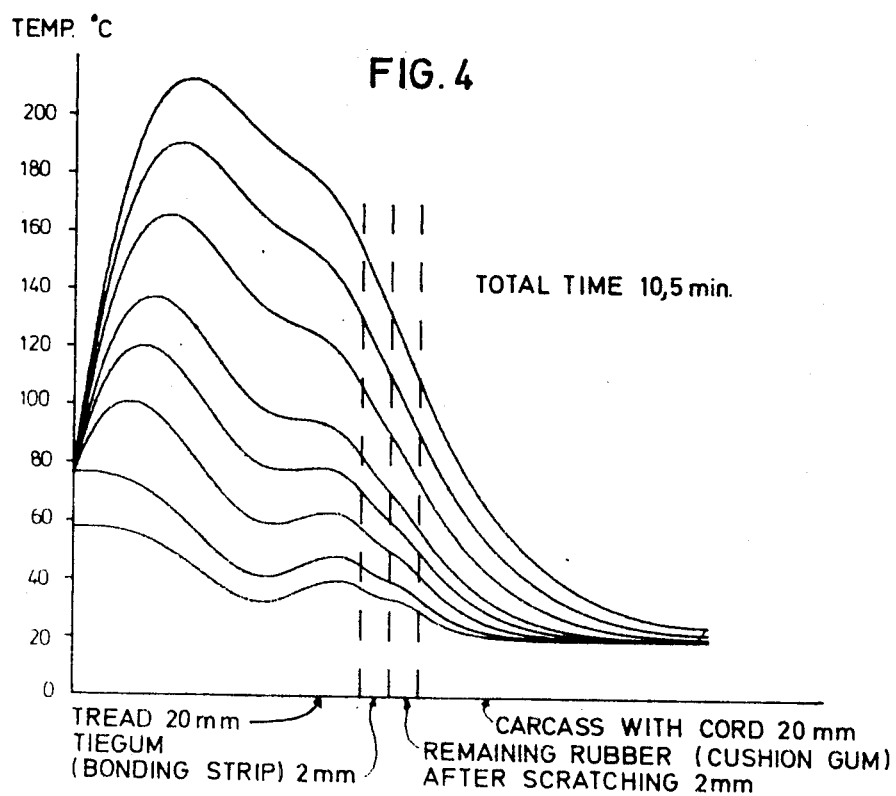

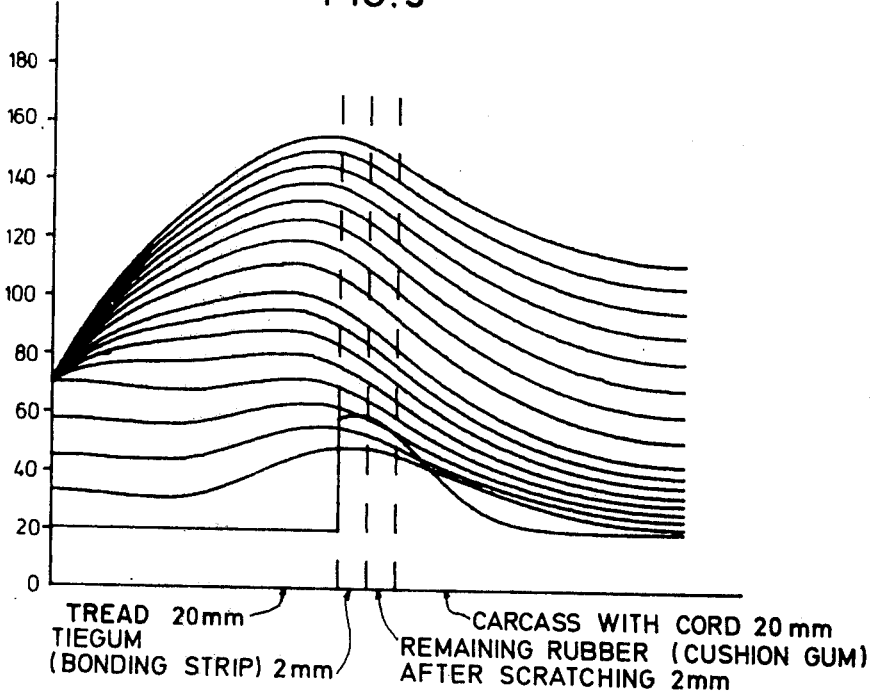
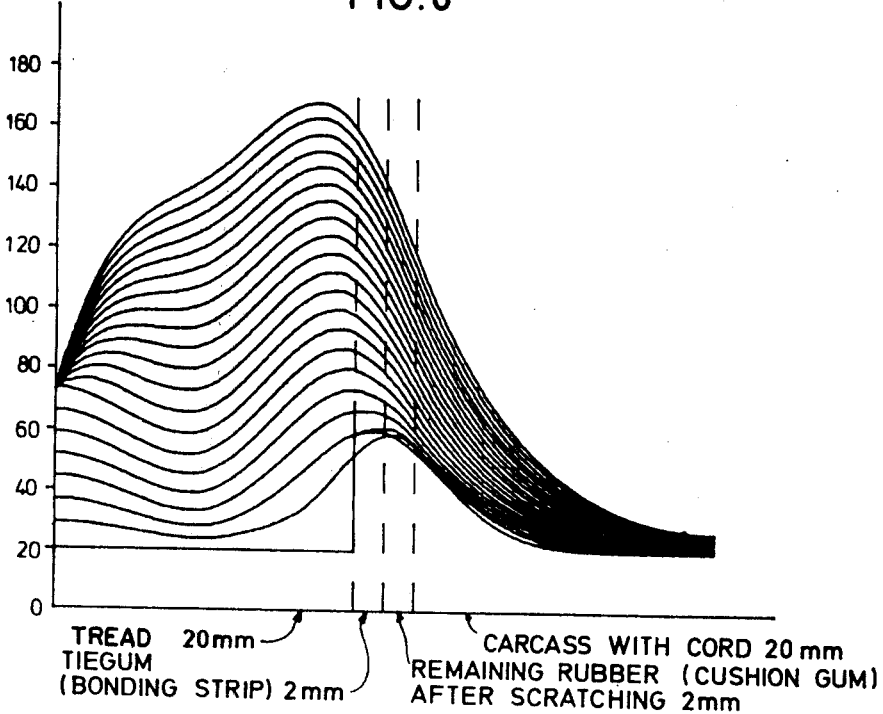

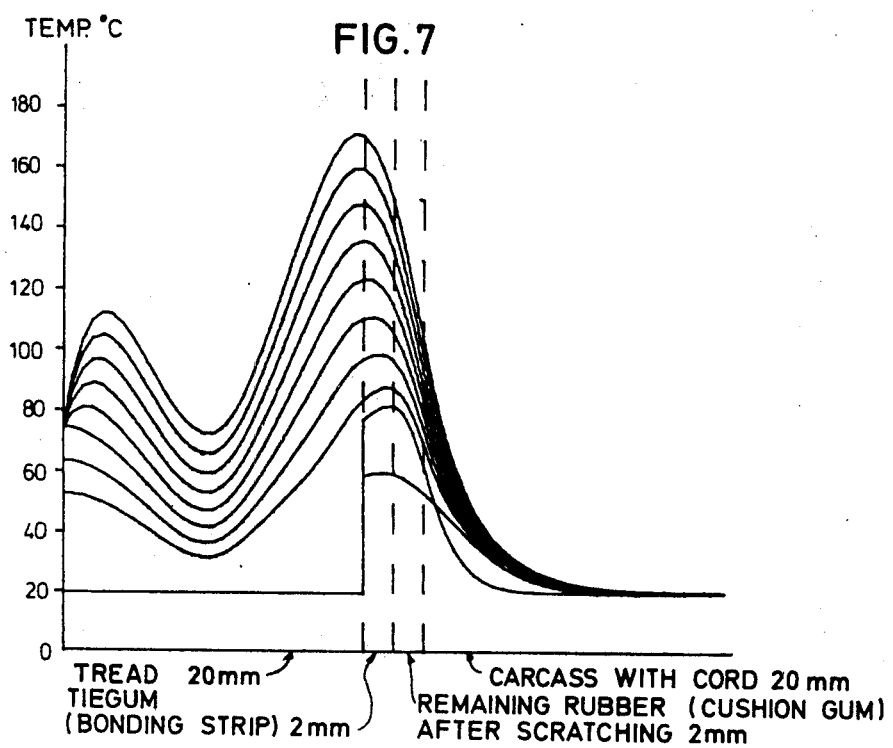

METHOD OF RETREADING VEHICLE TIRES USING MICROWAVE HEATING

The invention relates to a method of retreading vehicle tires using a prevulcanized tread and a strip of rubber base bonding material hereinafter called tiegum, whose special composition also falls within the scope of the invention, the package composed of carcass, bonding strip and tread are vulcanized together by means of microwave heating.

The advantages achieved with the invention compared with known and generally used technology are of both an economic and technical character. Retreading according to the new process takes a much shorter time than according to traditional methods, which in and of itself brings significant cost savings through increased productivity per unit of time and improved use of the capacity of the retreading equipment, and with the new process an effective bonding vulcanization of the prevulcanized tread can be achieved without subjecting it for a long period of time to the destructive or adverse effects of high temperatures.

BACKGROUND

The combination of high prices for raw materials and continually increasing labor costs has been viewed by the new-tire producing industry with great apprehension, since it is difficult to match these costs with increased production volume. Increased production costs for new tire production have increased interest within the field of tire retreading. The interest in recycling has also been a factor.

A conventional retreading plant is however expensive and has a low production capacity, i.e. the number of retreaded tires per hour.

Most conventional retreading systems work with prevulcanized treads. In all of these systems with prevulcanized treads the tire, after the old tread has been ground away, is provided with a new tread which is fixed to the carcass by means of a rubber base bonding strip, and the tire is then placed, depending on the system, in an autoclave or in a heated matrix. Heating of the autoclave or matrix is accomplished in most systems by means of steam, but electric heating is employed in some systems of both the autoclave and matrix type. The vulcanization time varies in the various systems between 1.5 and 5 hours.

According to another major system for retreading a new unvulcanized tread is used which under vulcanization is fixed to the old tire carcass.

Some of the most employed retreading systems and their most important differences are given below. The differences are mainly in the final work stages when the tread is to be fixed to the carcass.

1. Bandag system (Swedish Pat. No. 340 524)

A prevulcanized tread, including tread pattern, is fixed with the aid of tiegum to the tire carcass, which is mounted on a rim. An external rubber hood or cover is applied which is to stabilize the tread during the vulcanization process. The whole "package" is placed in an autoclave or pressure chamber which is then pressurized and heated to a temperature of between 60° and 150° C. by introducing a heated fluid into the pressure chamber. At the same time the tire is subjected to an internal pressure which should exceed the pressure in the autoclave or the pressure chamber by 1.1–3.5 kp/cm². The vulcanization time for achieving bonding vulcanization of the tread is about 5 hours and the vulcanization temperature is 90°–93° C. The production capacity is about one tire per man-hour.

2. Vacuum-Vulc system

The system is based on essentially the same principles as the Bandag system. The tires do not, however, need to be mounted on a rim but they must be provided with a rubber cover, a so-called Wollform. Heating is done with 85° C. water, which in the latest models is contained in an outer layer in the autoclave. Pressure on and stabilization of the tread are achieved according to the vacuum principle. The vulcanization time varies between 2.5 and 3.5 hours, depending on the vulcanization rate of the tiegum (the bonding strip). Investment costs and capacity are essentially the same as for Bandag.

3. Vulcap system

A small autoclave is used, which has room for one or two truck tires. The tires are mounted on rims but are not provided with wollforms. The tires are provided with a simpler form of rubber cover to protect the tread and tiegum against water and steam.

Heating is done with steam and the steam chamber also acts as a pressure medium and stabilizer means for the tread.

The vulcanization time is about 90 minutes and the capacity is about 0.6 tire per man-hour.

4. Autoclave with free steam system

The tire carcass is not mounted on a rim. The tread is held in place with longitudinal clamps of steel or nylon. The tires are placed in the autoclave with free steam and rotate during the vulcanization process. The autoclave holds as a rule between 6 and 7 truck tires. Vulcanization takes about 2.5 hours. The capacity is about 0.6 tire per man-hour.

SUMMARY OF THE INVENTION

The invention is based on the use of a prevulcanized tread. The main goal of the invention is, with the help of a microwave applicator, to fix a prevulcanized tread to the tire carcass by the special tiegum, i.e. rubber base bonding strip, which is used according to the invention and which, under the effect of the microwave heat, softens and vulcanizes fast to the tire carcass and the tread during such a short time that the prevulcanized tread is not destroyed or significantly reduced in quality due to the effect of the heat applied. The problem encountered in this process and which is to be solved according to the present invention, is that traditional tread and tiegum materials have such different dielectric characteristics (so-called loss factor) that the already prevulcanized tread will be heated more strongly than the tiegum and will thus be destroyed before the tread has vulcanized fast. This will be elaborated on below.

The advantages achieved with microwave heating in the method according to the invention are essentially the following:

The system saves time and the production per man-hour is high, so that variable costs are lower than for traditional systems.

The investment cost is lower than for traditional systems.

The quality is at least as high as in traditional systems.

The system can be used for varying tire dimensions.
The system improves the working environment.
The system is flexible with regard to lay-out in the place of work.

BRIEF DESCRIPTION OF THE DRAWINGS

FIG. 3 shows a computer simulation of temperature during microwave heating at 20 kW of an unacceptable tiegum, bonded to a carcass without preheating.

FIG. 4 shows a computer simulation of temperature during microwave heating at 50 kW of an unacceptable tiegum bonded to a carcass without preheating.

FIG. 5 shows a computer simulation of temperature during microwave heating at 5 kW of four acceptable tiegums bonded to a carcass.

FIG. 6 shows a computer simulation of temperature during microwave heating at 20 kW of the same four acceptable tiegums bonded to a carcass.

FIG. 7 shows a computer simulation of temperature during microwave heating at 76 kW of the same four acceptable tiegume bonded to a carcass.

DETAILED DESCRIPTION

Figure 1:
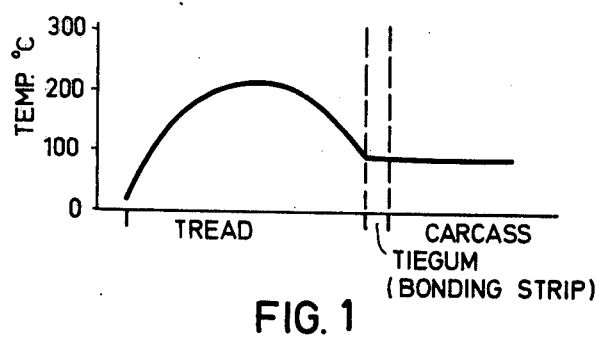
FIG. 1 shows a computer simulation of the heating process using microwaves for a typical carcass/known tiegum/tread combination.

To effectively heat a material with microwaves it must have a high so-called dielectric loss factor, usually designated $\epsilon''$. This loss factor usually increases sharply in rubber mixtures with temperature and therefore it is important to achieve a microwave field which is as even as possible, especially for avoiding blisters in a rubber material which is heated by microwaves. The more nearly even the field is, the higher the temperature is, in principle, which can be applied to a rubber material without blistering, which in turn means shorter process times and more effective use of the microwave energy.

Microwaves began to be used even in the 1950's for vulcanization or preheating of rubber before compression molding, which was a great advance, since even quite complicated rubber profiles could be quickly vulcanized with good results.

Different processes and apparati for final vulcanization of extruded rubber articles or for preheating of rubber articles before compression molding have thus been described in Swedish Pat. Nos. 97,304, 105,210, 125,411, 148,079 and in Swedish Lay-open Print No. 357,918, in U.S. Pat. Nos. 3,471,352 and 3,639,190, British Pat. No. 1,311,126, German Pat. No. 895,371, and German Offenlegungsschrift No. 2,122,578. Also, U.S. Pat. No. 2,541,644 describes a special apparatus for vulcanization of vehicle tires by means of "radio frequency currents".

U.S. Pat. No. 3,880,693 describes a process for bonding together vulvanized films of rubber material, said process being characterized in that a layer of a vulcanizable composition based on a rubber polymer—said composition producing heat when subjected to an electrical high frequency field—is placed between the films to be bonded together, and the whole assembly of films are then heated under pressure in an electrical field with a frequency of about 0.1 to about 500 MHz. The finished product is said to be suited for sealing and coating purposes.

To transfer this teaching with high frequency heating to retreading of vehicle tires by microwave heating is not possible. The microwave range extends from 1000 to 100,000 MHz and thus differs quite significantly from the frequency range used in the U.S. patent specification, i.e. 0.1–500 MHz. The apparatus used according to the U.S. patent specification consists in principle of a condenser between whose plates the film-shaped material is heated. Such a condenser can function as long as its dimensions are less than 1/10 wavelength. This means that at high frequency the condenser can heat lengths of up to 1 meter. For microwave frequencies with a typical frequency of 2450 MHz the dimensions of the condenser must be less than 1 cm. If the dimensions are larger, variations in heating occur which are unacceptable. Even from this it is possible to see why the teaching of the U.S. patent specification cannot be transferred to the problem of retreading tires. In the patent specification it is stated that acceptable thicknesses are 0.2–20 mm. The thickness is limited by the so-called penetration depth in various materials and since the penetration depth is inversely proportional to the frequency, 0.2–20 mm at high frequencies corresponds to 0.002–0.2 mm at microwave frequencies. Thus it is even more evident why the teaching of the U.S. patent specification is not applicable to the problem solved by the present invention.

According to the U.S. patent HF equipment is used, as was already mentioned, and an electrode is placed on either side of the object to be heated. This is completely impossible in the process according to the present invention. It would complicate the method so much that the advantages achieved would be significantly less than the disadvantages, if it were at all possible.

The patent specification discloses that the dielectric characteristics must be such that the losses are greater in the tiegum than in the surrounding medium. It does not say at what temperature this is to apply. If room temperature is intended, which is the usual when measurement data are given, the reverse relationship applies to the tiegum according to the present invention. According to the present invention a temperature rise is employed to change the relationship between the surrounding vulcanized rubber material and the tiegum. According to the U.S. patent the importance of the temperature has not been understood and heeded for variations in the dielectric losses in the rubber. Rather it concentrates solely on the composition of the tiegum in relation to the composition of the films which are to be laminated.

Furthermore the U.S. patent specification states in col. 4 lines 23–28 that the tiegum between the layers to be bonded should preferably contain the same polymers as the layers. We would point out that the losses for all known rubber materials at microwave frequencies are lower than in the unvulcanized rubber.

In vulcanizing of rubber a large amount of heat must be supplied and since the heat conductivity is quite poor, the supplying of heat and its spreading takes a long time according to traditional methods of vulcanization. In vulcanizing thick rubber profiles, including tires, in traditional vulcanization heat must be conducted from the surface into the material, e.g. a tread. The result is often an uneven vulcanization through the cross section of the rubber profile with the lowest degree of vulcanization close to the center of the thickest section of the rubber profile. The higher the temperature used, the more uneven the vulcanization will be. Too high temperatures result in overvulcanization of the surface of a tire tread for example, so that wear characteristics are sharply worsened or are lost completely. Therefore in vulcanization of tires it is necessary to use a long vulcanization time at a relatively low temperature to obtain acceptable characteristics in the finished tire. The same applies to traditional retreading of tires.

It has however been found (RUBBER AGE, June 1975, page 43 ff, "Giant Tire Microwave System", W. Val Smith and Robert A. Peterson) that the vulcanization time in new production of large transport tires can be cut by one third by preheating the unvulcanized tire tread by means of microwave energy, before final vulcanization. Since the microwaves are able to penetrate into the rubber mass without causing overheating on the way, a rather even heat distribution is achieved throughout the entire tread, as long as the temperatures are not too high. In the article in Rubber Age it was stated that the optimal preheating temperature for the tire in question (2000 pound truck tire) was 210° F. (99° C.) and and even temperature distribution was achieved without the risk of overheating. The article also shows how the loss factor varies with temperature for a special rubber mixture used and it is evident that the loss factor begins to increase sharply at about 185° F. (85° C.). It states that if the tire is subjected to microwave energy at temperatures far above 100° C. it would be difficult to control the heating process. These factors prevent one from being able to completely vulcanize the tire with microwave energy, i.e. when the temperature approaches vulcanization temperature one can no longer control the heating process so as to achieve an even temperature throughout the entire thick tread. In the article it is stated that the type of rubber mixture appears to have little effect on the heating result.

The article in Rubber Age does not say anything about the possibility of using microwave heating in retreading tires with unvulcanized or previously finally vulcanized treads. The reason for this is quite simply that given above, namely that it is obvious to the man skilled in the art that microwave heating for, for example, final vulcanization of a tread with known technology gives a much too unevenly distributed heating and thus varying degrees of vulcanization in the tread. Since great demands are placed on the mechanical characteristics of the tread, it is not possible to vulcanize treads with microwave heating and achieve good results.

This difficulty arises both in attempts to produce new tires an to retread an old tire with an unvulcanized tread, which is to be vulcanized onto the old tire carcass.

The present invention was directed to the problem of whether it is possible to work with a previously ready-vulcanized tread and bonding it to the old tire carcass by means of a tiegum which is vulcanized with the help of microwave energy, i.e. without the prevulcanized-tread being damaged by the applied heat.

The risk of uneven heating of tiegum is less than for vulcanization of an entire tread, since the tiegum is so thin (about 2 mm), but conversely the microwaves must accomplish the task of vulcanizing the tiegum without heating the previously vulcanized tread to such a high temperature that it is destroyed or the resistance to abrasion is lost to a significant degree. Whether this is possible depends on certain material characteristics of the rubber, namely the dielectric characteristics ($\epsilon$ and $\tan\delta$). It is required that the dielectric loss factor ($\epsilon''=\epsilon\cdot\tan\delta$) be higher for the tiegum (the rubber-base bonding strip) at the vulcanizing temperature than for the vulcanized tread, so that the microwave heat will be concentrated to the tiegum instead of to the already vulcanized tread.

Initially therefore, the traditional tiegums and ready-vulcanized treads were investigated to find out whether they fulfill the requirements.

The heat effect which is generated in a material which is placed in an electromagnetic field can be expressed by the equation $$P_v = \pi \cdot f \cdot \epsilon_0 \cdot \epsilon'' \cdot (E)^2$$

where
$P_v$ = heat effect per unit of volume
f = frequency of the field $$\epsilon_0 \approx 1/36\pi \cdot 10^{-9}$$

$\epsilon''$ = dielectric loss factor of the material ($\epsilon''=\epsilon\cdot\tan\delta$)
E = electric field strength
$\epsilon$ = dielectric constant
$\delta$ = dielectric loss angle As has already been mentioned, the tiegum should have a higher dielectric loss factor than the already vulcanized tread to make vulcanization bonding of the tread possible by means of microwaves without the tread being destroyed by the excess heat. The advantages of a higher loss factor for the tiegum can be briefly summarized as follows:

rapid heating of the tiegum
relatively low power required for vulcanization
low temperature in the tread.

To investigate whether materials available on the market, i.e. tiegums and ready-vulcanized treads, fulfill the requirements specified above to make vulcanization bonding possible of a vulcanized tread by means of a tiegum and with microwaves as a heat source, the dielectric constant ($\epsilon$) and the loss angle ($\tan\delta$) were measured at the frequency 2.4 GHz for 5 different rubber materials, namely (1) a ready-vulcanized tread, (2) an unvulcanized tiegum for steel radial tires, (3) an unvulcanized tiegum for bias construction tires, (4) an unvulcanized tiegum in the form of a natural rubber plate, and (5) an unvulcanized patch interlayer rubber.

The measurements were carried out at the temperatures 25° C. (room temperature), 50° C., 100° C. and 140° C.

The results of the dielectric measurements are shown in Table 1.

Table 1

| Dielectric characteristics of traditional rubber material | | | | |
|---|---|---|---|---|
| | E | tan δ | E" | approx. temp. |
| Pre-vulcanized tread | 4.6 | 0.084 | 0.390 | 25° C. |
| | 4.6 | 0.098 | 0.459 | 50° C. |
| | 4.6 | 0.124 | 0.579 | 100° C. |
| | 4.5 | 0.148 | 0.671 | 140° C. |
| Vulcanized cushion gum (base plate) for steel radial tires | 3.6 | 0.048 | 0.172 | 25° C. |
| | 3.6 | 0.068 | 0.244 | 50° C. |
| | 4.1 | 0.136 | 0.550 | 100° C. |
| | 4.3 | 0.193 | 0.831 | 140° C. |

Table 1-continued

Dielectric characteristics of traditional rubber material

| | E | tanδ | E" | approx. temp. |
|---|---|---|---|---|
| Unvulcanized tiegum for steel radial tires | 3.1 | <0.001 | <0.003 | 25° C. |
| | 3.2 | <0.001 | <0.003 | 50° C. |
| | 3.1 | 0.005 | 0.015 | 100° C. |
| | 3.4 | 0.017 | 0.057 | 140° C. |
| Unvulcanized tiegum for bias construction tires | 3.0 | <0.001 | <0.003 | 25° C. |
| | 3.1 | <0.001 | <0.003 | 50° C. |
| | 3.0 | 0.006 | 0.019 | 100° C. |
| | 3.1 | 0.022 | 0.068 | 140° C. |
| Unvulcanized tiegum in the form of a natural rubber plate | 3.5 | <0.001 | <0.003 | 25° C. |
| | 3.4 | <0.001 | <0.003 | 50° C. |
| | 3.6 | 0.025 | 0.086 | 100° C. |
| | 3.6 | 0.043 | 0.150 | 140° C. |
| Patch-interlayer rubber | 3.4 | <0.001 | <0.003 | 25° C. |
| | 3.4 | 0.002 | 0.008 | 50° C. |
| | 3.6 | 0.015 | 0.053 | 100° C. |
| | 4.5 | 0.068 | 0.290 | 140° C. |

On the basis of the dielectric measurements, computer simulation was done of simultaneous microwave heating of carcass, tiegum and pre-vulcanized tread.

The results of the measurements carried out show that existing traditional tiegums have lower dielectric loss factors than existing ready-vulcanized treads, making it impossible to use microwave heating in retreading tires with existing tiegums and ready-vulcanized treads.

This conclusion is most clearly illustrated by the accompanying FIG. 1, which shows a computer simulation of the heating process by means of microwaves for a typical combination carcass/known tiegum/tread. As the figure shows, the microwave heat is concentrated in the tread instead of the tiegum. The retreading process, which presently works at the lowest temperature, requires about 90° C. in the tiegum. At this temperature in the tiegum the tread reaches a temperature of over 210° C. in certain portions, which is not acceptable.

The problem which was to be solved according to the present invention was thus, among other things, to compound a new tiegum with a higher dielectric loss factor than existing tiegums, so that said new tiegum would make possible vulcanization bonding of existing ready-vulcanized treads by means of microwave heating and at the same time providing satisfactory adhesion between carcass and tread. In the new process the tiegum is preferably preheated to thereby additionally increase its dielectric loss factor, which increases sharply with temperature.

For the new tiegum compounds which have been developed, the strength characteristics have been determined. Furthermore the dielectric characteristics ($\epsilon'$ and tanδ) have been determined and the loss factor $\epsilon''$ has been computed. On the basis of these results, the heating process for the combustion tire carcass, tiegum, ready-vulcanized tread was determined by computer simulation.

The initial requirement in the production and testing of the new tiegum compounds was that the mixtures at a selected vulcanization temperature of 149° C. in laboratory trials (vulcanization bonding to a plate of previously vulcanized tread compound of traditional composition) must provide a perfectly satisfactory bonding between the two materials. The dielectric characteristics were determined for the test compounds which fulfilled this requirement, and computer simulation was done of the heating process for the combination tire carcass/tiegum/ready-vulcanized tread.

Tests showed that not all mixtures which demonstrated satisfactory strength characteristics, such as bonding capacity with the tread material, passed the computer simulation test. These unacceptable compounds did not have at vulcanization temperature dielectric loss factors sufficiently higher than the tread to prevent too high temperatures in the tread during the time it takes to vulcanize the tiegum.

The accompanying FIG. 2 (curve 1) shows the loss factor $\epsilon''$ as a function of the temperature for an unacceptable tiegum, namely for the best of the tested traditional tiegums listed in Table 1 as "Patch-interlayer rubber", and the loss factor for an acceptable tiegum according to the invention (curve 2), whose composition is described in the following, and finally the loss factor for the vulcanized tread (curve 3) according to Table 1. The relationship between the heat development in the tread and in the tiegum depends, as has already been mentioned, to a great extent on the relationship between the loss factors of the respective materials. This relationship becomes more and more favorable as the temperature increases. This is the reason for the preheating of the tiegum, as is suggested according to the invention. From FIG. 2 one can see that even preheating is not a sufficient measure for a normal tiegum. The heat which is supplied to a traditional tiegum by means of microwave heating is supplied through heat conduction from the tread.

To illustrate the difference between the two types of tiegum, the heating process has been simulated with the aid of computer calculations. In the process according to the invention the tiegum is preheated, for the reasons given above, to 60°–80° C. by means of hot water (about 120° C.). This has been taken into account in the computer simulation, i.e. a preheating of the tiegum according to the invention has been assumed to about 70° C.

Figure 2:
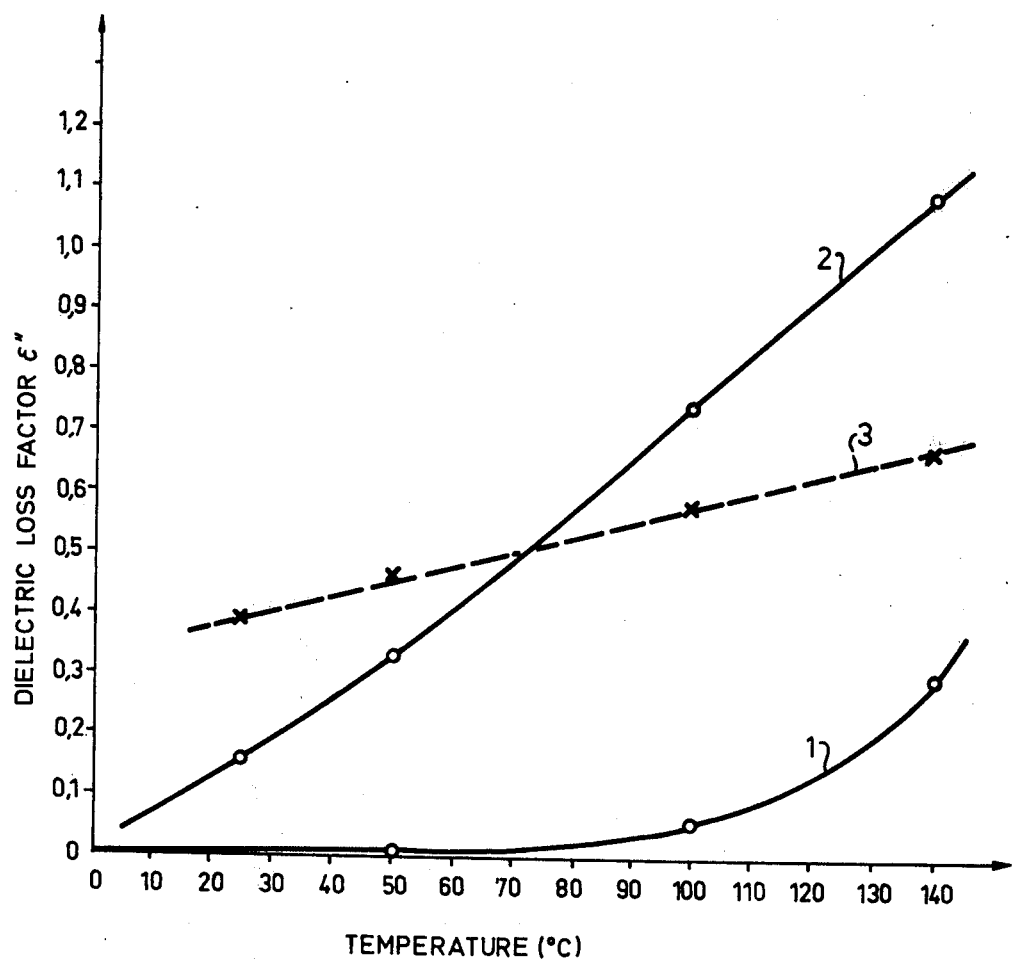
FIG. 2 shows the loss factor $\epsilon$ as a function of temperature for an unacceptable tiegum (curve 1), an acceptable tiegum (curve 2) and the vulcanized tread (curve 3).

In the computer simulation of the heating process for the unacceptable tiegum according to curve 1 in FIG. 2, there was no preheating since, as is evident from FIG. 2, the dielectric losses cannot be raised to a satisfactory level in this manner. Preheating would not appreciably affect the heating time up to vulcanization temperature.

For the sake of illustration, a computer simulation was done of microwave heating of the unacceptable tiegum without preheating first with a total microwave effect of 20 kW for a truck tire with normal tread width and thickness, corresponding to a power density of 50 W/cm$^2$ and then, to investigate whether a higher microwave power would affect the heating process, with a total microwave power of 50 kW, corresponding to a power density of 125 W/cm$^2$.

The result of the computer simulation with a microwave power of 20 kW (power density 50 W/cm$^2$) is given in FIG. 3 and with the microwave power 50 kW in FIG. 4. From FIG. 3 it is evident that in microwave heating of this tiegum with a total power of 20 kW it takes 31 minutes to heat it to 140° C. and by extrapolation it can be determined that it would take about 36 minutes to heat to 149° C. which is the temperature, as was mentioned previously, at which the vulcanization of the various rubber samples was done to determine strength characteristics, e.g. adhesion between the tiegum and the tread.

FIG. 3 shows that during the 36 minutes it takes to bring the temperature in the tiegum up to 149° C. the maximum temperature in the tread will reach a little below 180° C. In addition to the starting time of 36 minutes to the vulcanization temperature of 149° C., the vulcanization time at this temperature in the retreading with this tiegum must be added. This vulcanization time amounts to about 10–12 minutes. The reason that this tiegum cannot be accepted according to the goal of the invention, in spite of the fact that it fulfills the adhesion and strength requirements, is that the heating time of 36 minutes up to 149° C. (plus 10–12 minutes at this temperature) is judged to be too long. According to the invention a total time of less than 30 minutes is striven after for the vulcanization cycle (retreading time).

When the microwave power for this unacceptable tiegum was raised to a total of 50 kW, in order to shorten the heating time, it took, as shown in FIG. 4, 10.5 minutes for the tiegum to reach 140° C. and by extrapolation it is calculated that it will take 12.5 minutes to reach 149° C. During the corresponding time, however, the temperature in the tread reaches 210° C. and 230° C. respectively, which is unacceptable in view of the strength characteristics of the tread.

The dielectric characteristics of the tiegum according to the invention, which are represented by curve 2 in FIG. 2, are given in the following Table 2:

Table 2

| Dielectric characteristics of tiegum according to the invention | | | |
|---|---|---|---|
| E | tanδ | E″ | approx. temp. |
| 5.8 | 0.28 | 0.161 | 25° C. |
| 5.9 | 0.055 | 0.328 | 50° C. |
| 6.3 | 0.115 | 0.743 | 100° C. |
| 7.0 | 0.156 | 1.081 | 140° C. |

Computer simulation of microwave heating of tiegum according to Table 2 is shown in FIGS. 5, 6 and 7 for heating with a total microwave power of 5 kW, 20 kW and 76 kW respectively, corresponding to a power density for the truck tire in question with normal rubber thickness, tread width and tread circumference of 12.5 W/cm², 50 W/cm² and 76 W/cm² respectively.

At a total power of 5 kW (FIG. 5), corresponding to a power density of 12.5 W/cm², a preheating of tiegum plus carcass to 60° C. was taken into account.

At a total power of 20 kW, a preheating of tiegum and carcass to 60° C. was taken into account, and a total power of 76 kW a preheating of tiegum and carcass to 60° C. was also taken into account.

At total power 5 kW (FIG. 5) it takes 70 minutes, at 20 kW (FIG. 6) about 6 minutes, and at 76 kW (FIG. 7) about 50 seconds to raise the temperature in the tiegum to 140° C., corresponding to about 80 minutes, about 6.5 minutes or 45 seconds respectively to raise the temperature to 149° C. Added to these times, as for the unacceptable tiegum, is the time for complete vulcanization at the vulcanization temperature reached. This vulcanization time is for the tiegum investigated 10.4 minutes, as will be stated below. The total vulcanizing process for retreading with this tiegum could thus be divided as follows:

| Preheating: | Approx. 3 minutes | | |
|---|---|---|---|
| Heating to 149° C. at for example a total microwave power of 20 kW: | " | 6.5 | " |
| Finished vulcanization: | " | 10.4 | " |
| Total: | " | 20 | " |

If a "safety margin" is added, resulting in a total vulcanization time for retreading of about 25 minutes for a microwave power of 20 kW, this is still a remarkable shortening of the vulcanization time in retreading compared to traditional retreading, which takes somewhere between one and five hours.

The reason that the heating time is reduced so sharply with increasing power is that the microwave heating is concentrated to the tiegum, but heat conduction works for an evening out, i.e. energy is conducted from the tiegum to the tread and carcass. After the temperature has been raised to 149° C. in the tiegum, the mean temperature in the tread at 5 kW of power is about 130° C., at 20 kW of power also 130° C., but at 76 kW of power is about 100° C.

It is of course very difficult and time-consuming to find out by experiment the complete relationship between the various parameters, that is the components in the tiegum compound, which satisfy the requirements on the compound described above. The following examples of experimentally tested compounds should therefore not be regarded as the limits of the invention, of which one essential characteristic is instead that the tiegum at vulcanization temperature must have a higher dielectric loss factor than the previously vulcanized tread. The experiments to date have shown however that the type of polymer and carbon black in the tiegum compound have a very great effect on the dielectric characteristics of the compound, i.e. so that its dielectric characteristics will stand in the described relation to the dielectric characteristics of the tread.

It has been found that the following tiegum composition fulfills the requirements in connection with the treads in question of commercially available type. In agreement with that stated above, it should be pointed out here that retreading with another type of tread than that used in the experiments can also affect the requirements concerning the composition of the tiegum, since different treads can have varying dielectric losses. However, this can only possibly affect the composition of the tiegum for quite varying treads, but not the idea of the invention, namely that the tiegum at vulcanization temperature must have a higher loss factor than the tread.

Experimental compounds fall within the limits of the following recipe:

| Chloroprene rubber | 80–100 | parts by weight |
|---|---|---|
| Butadiene rubber | 0–20 | " |
| Magnesium oxide | 6 | " |
| Resin | 2 | " |
| Stearic acid | 3 | " |
| Accelerator | 2–5 | " |
| Process agent | 5 | " |
| Softener | 15–20 | " |
| Carbon black of reinforcing furnace type with pellet size <50 nm | 50–55 | " |
| Zinc oxide | 6 | " |
| Sulphur | 1–3 | " |

The following compounds can be given as specific examples of the composition in the tiegum according to the invention:

| | Compound A (parts by weight) | Compound B (parts by weight) |
|---|---|---|
| Chloroprene rubber | 98 | 100 |
| Butadiene rubber | 2 | — |
| Magnesium oxide | 6 | 6 |
| Resin | 2 | 2 |
| Stearic acid | 3 | 3 |

-continued

|  | Compound A (parts by weight) | Compound B (parts by weight) |
|---|---|---|
| Accelerator | 2.33 | 2.33 |
| Highly aromatic oil | 12 | 12 |
| Raw filtered linseed oil (softener) | 5 | 5 |
| Diactylphthalate (process agent) | 5 | 5 |
| Carbon black HAF | 54 | 54 |
| Zinc oxide | 6 | 6 |
| Sulphur paste 75% insoluble, 25% M-oil | 2.67 | 2.67 |
|  | 198.00 | 198.00 |

A compound C was also prepared which differed from Compound A in that carbon black HAF was replaced by carbon black FEF.

For compounds A, B and C the dielectric characteristics were determined, more specifically $\epsilon$, $\tan\delta$ and $\epsilon''$.

The dielectric characteristics for Compound B are given in the above Table 2 and in FIG. 2 as curve 2 and the accompanying computer simulation of the heating process in FIGS. 5, 6 and 7.

For compound A, which agrees with Compound B except that the polymer is a mixture of chloroprene rubber and butadiene rubber, and for Compound C, which agrees with Compound A except that carbon black of HAF type has been replaced by carbon black of FEF type, the dielectric characteristics are given in Table 3:

Table 3

| Dielectric characteristics of Compounds B and C | | | | |
|---|---|---|---|---|
|  | E | tan$\delta$ | E'' | temp. |
| Compound A | 5.4 | 0.03 | 0.16 | 25° C. |
|  | 5.8 | 0.06 | 0.35 | 50° C. |
|  | 6.2 | 0.11 | 0.68 | 100° C. |
|  | 6.6 | 0.16 | 1.05 | 140° C. |
| Compound C | 3.9 | 0.02 | 0.08 | 25° C. |
|  | 4.1 | 0.03 | 0.12 | 50° C. |
|  | 4.3 | 0.06 | 0.26 | 100° C. |
|  | 4.6 | 0.10 | 0.46 | 140° C. |

Comparison of these values with the graph in FIG. 2 shows that Compound A (with chloroprene rubber plus butadiene rubber) fulfills the requirements according to the invention while Compound C (with FEF carbon black instead of HAF carbon black) does not fulfill the requirements, that is to say, for this compound there is a loss factor at vulcanization temperature *below* the loss factor of the tread.

Laboratory tests were carried out with vulcanization and strength determination of the tiegum compounds according to the invention, and the values shown in Table 4 were obtained for Compound A:

Table 4

| Physical characteristics of the tiegum according to the invention | |
|---|---|
| Density | 1.34 |
| Vulcanization 149° C., 2 mm plate | |
| 15 minutes | |
| 45 minutes | |
| State of cure T-3.5 | 1.05 minutes |
| T-50 | 2.75 " |
| T-90 | 8.35 " |
| T-95 | 10.40 " |
| The value for T-95, i.e. 10.40 minutes, is considered to be the required time for finished vulcanization of the sample. | |

Table 4-continued

| Adhesion to tread rubber | 171 N |
|---|---|
| Rupture limit MN/m$^2$ | |
| 15 minutes | 17.6 |
| 45 minutes | 18.6 |
| Module 300 % MN/m$^2$ | |
| 15 minutes | 12.9 |
| 45 minutes | 16.4 |
| Elongation at break % | |
| 15 minutes | 405 |
| 45 minutes | 320 |

EXAMPLES

The tire carcass is scraped to a suitable profile. After patching of any damage in the tire crown and after applying a special solution with the same composition as the tiegum strip, the tiegum, previously made into a strip, is applied on the tire crown in the same width as the tread to be applied and in a length equal to the circumference of the carcass.

A prevulcanized tread is then applied, the length and width of which are fitted to the crown width and circumference of the carcass.

The whole assembly is joined together by means of a roller device during rotation of the tire, the joining being begun in the center of the crown and being finished at its outer edges to avoid trapping air between the tread and tiegum.

Figure 8:
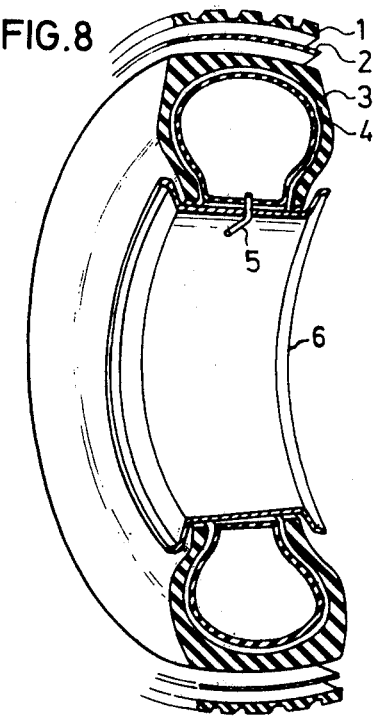
FIG. 8 is a cross-section of a tire assembly provided with an inner tube and a rim, shown in partial exploded perspective.

The tire is then provided with an inner tube with a valve for water and is mounted on a quick-coupling rim. These steps are shown in FIG. 8, in which 1 is the tread, 2 is the tiegum, 3 is the carcass, 4 is the inner tube, 5 is a valve and 6 is the rim.

Figure 9:
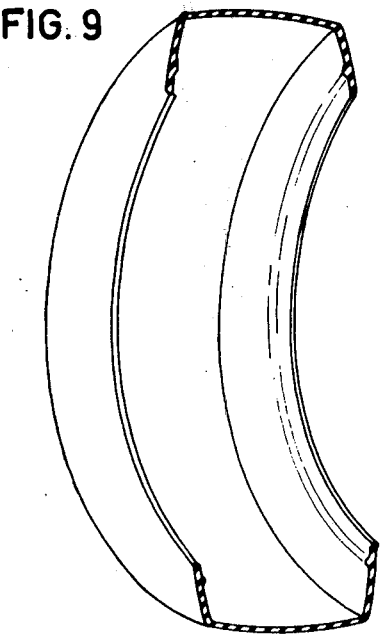
FIG. 9 is a cross-section of an outer tube shown in partial perspective.

An outer tube (outer cover) with an air evacuation outlet according to FIG. 9 is mounted outside the tire.

Figure 10:
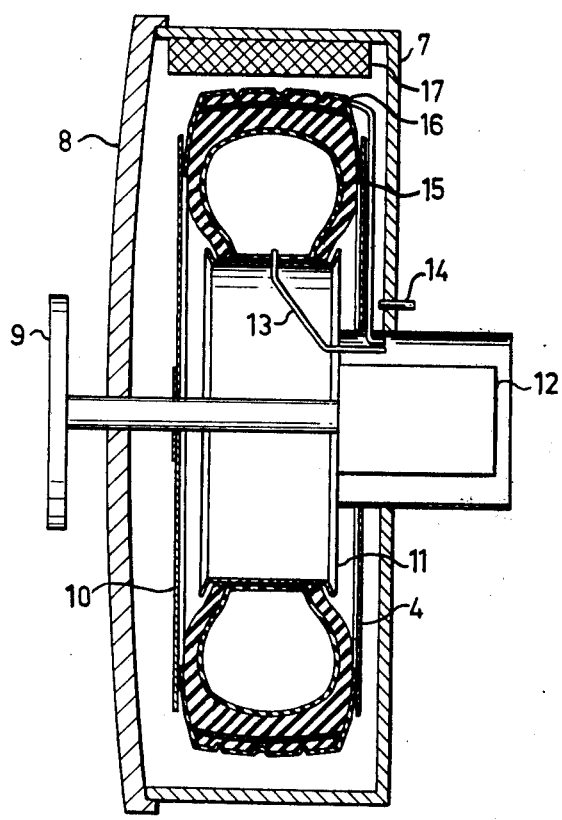
FIG. 10 is a cross-section of the whole tire assembly in an autoclave provided with a microwave applicator.

The whole tire assembly is placed in an autoclave between two pressure plates, as shown in FIG. 10. The autoclave has room for one or more tires. In FIG. 10, 7 is the autoclave casing, 8 is the autoclave cover, 9 is a locking device, 10 pressure plates, 11 the tire rim, 12 a drive motor, 13 a two-way valve, 14 a two-way conduit for autoclave pressure, 15 inner tube, 16 outer tube with air drain, and 17 microwave applicator.

After sealing the autoclave and connecting all of the connections, the final vulcanization process is begun.

The inner tube 15 in the tire is filled with hot water, approx. 120° C., to a pressure of approx. 750 kPa/cm$^2$ (working pressure of the tire). This hot water has the function of preheating the tiegum so that it will have better dielectric characteristics for heating and vulcanization with microwave heat.

The autoclave is filled with air to a pressure of approx. 500 kPa/cm$^2$.

The pressure difference between the pressure inside the tire and that outside the tire—equal to the autoclave pressure—should be about 200–250 kPa to obtain optimum adhesion between carcass and tread.

The trapped air between the tread and outer tube is evacuated through the outlet line by means of the pressure difference between the autoclave pressure and the atmospheric pressure. The autoclave pressure centers and holds the tread in the correct position during the vulcanization process.

The pressure plates (10) on both sides of the tire(s) make a complete seal possible between the elastic outer tube 16 and the sides of the tire to prevent air from forcing its way in between the tread and tiegum.

The microwave heating then begins by means of the microwave applicator 17 disposed inside the autoclave, while the tire is caused to rotate at a speed adjusted to the heating effect and the desired state of cure.

What we claim is:

1. Method of retreading vehicle tires using a prevulcanized tread and a tiegum, characterized in that
   (a) the tire carcass (3) is prepared and scraped in a manner known per se, and any damage is repaired;
   (b) a strip of rubber-base bonding material (2), whose dielectric loss factor $\epsilon'' = \epsilon \cdot \tan\delta$, where $\epsilon$ designates the dielectric constant and $\delta$ is the dielectric loss angle, at a selected vulcanization temperature for the bonding strip is greater than the loss factor of the prevulcanized tread, is applied to the tire carcass;
   (c) the prevulcanized tread (1) is applied on top of the bonding strip (2) and the assembly comprising carcass, bonding strip and tread is joined together by means of a roller device, the tire is provided with an inner tube (4,15) for water, is mounted on a rim (6,11) and is provided with an outer tube (outer cover) (16, FIG. 10 and FIG. 9), provided with an air evacuation outlet;
   (d) the entire tire assembly is placed in an autoclave between two pressure plates (10), the inner tube (15) is filled with hot water to a pressure of about 750 kPa/cm$^2$ and the autoclave chamber is filled with air to a pressure of about 500 kPa/cm$^2$; and
   (e) the assembly comprising carcass, bonding strip and tread is set in rotation and is vulcanized together by means of microwave energy from a microwave applicator (17) disposed inside the autoclave.

2. Method according to claim 1, characterized in that the hot water in the inner tube is hot water with a temperature of about 120° C., which preheats from the inside the bonding strip to about 60°–80° C. for the purpose of raising the dielectric loss factor of the bonding strip.

* * * * *